G. Z. CLARK.
WHIFFLETREE HOOK.
APPLICATION FILED JUNE 23, 1911.
1,019,949.
Patented Mar. 12, 1912.
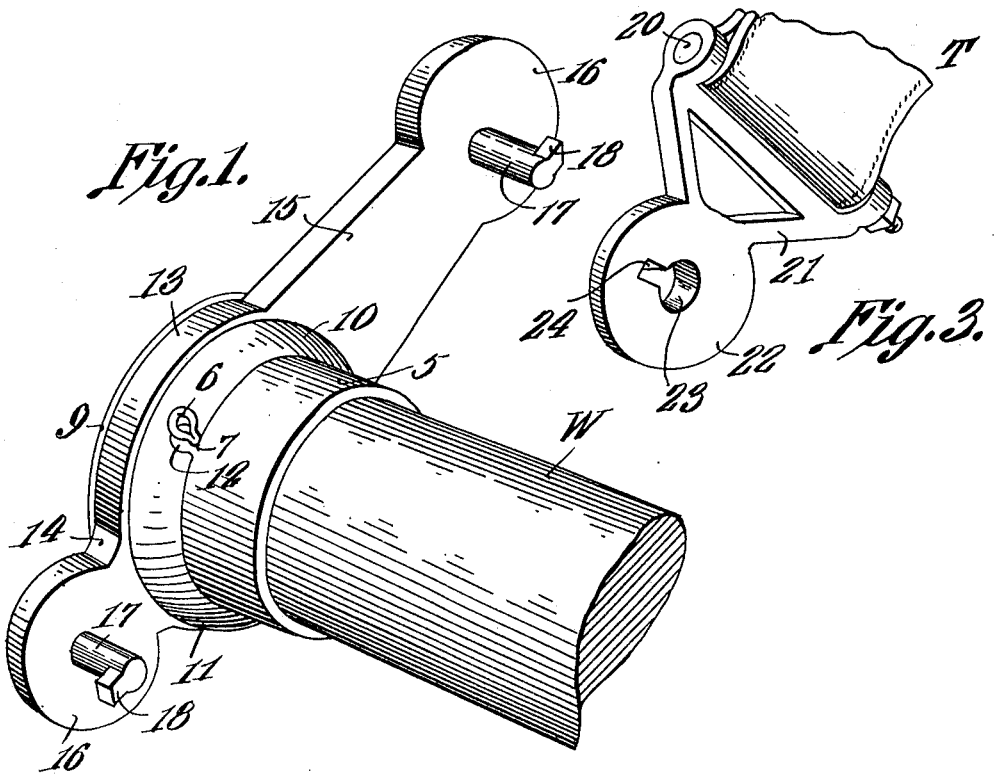
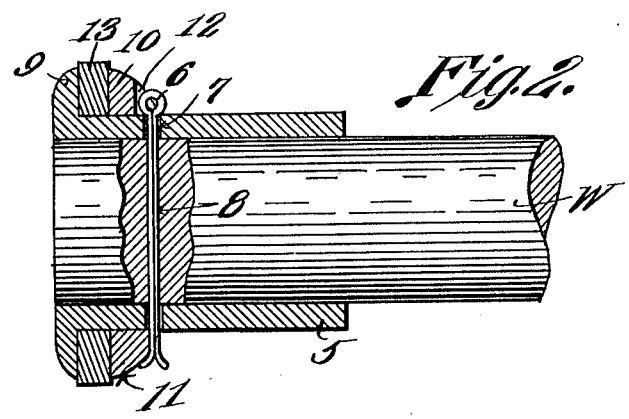
Witnesses
Guy Z. Clark,
Inventor
by C. A. Snow & Co.
Attorneys

UNITED STATES PATENT OFFICE.

GUY Z. CLARK, OF BILLINGS, MONTANA.

WHIFFLETREE-HOOK.

1,019,949.  Specification of Letters Patent.  Patented Mar. 12, 1912.

Application filed June 23, 1911. Serial No. 634,876.

*To all whom it may concern:*

Be it known that I, GUY Z. CLARK, a citizen of the United States, residing at Billings, in the county of Yellowstone and State of Montana, have invented a new and useful Whiffletree-Hook, of which the following is a specification.

This invention relates to carriages and wagons, and more especially to whiffletree hooks; and the object of the same is to produce a hook of this kind which is revolubly mounted upon the end of the whiffletree so that it can be instantly shifted to make it longer or shorter and thus avoid the necessity for lengthening and shortening the traces. This object is accomplished by the construction described below and shown in the drawings wherein—

Figure 1 is a perspective view of one end of the whiffletree with my improved hook connected thereto. Fig. 2 is a sectional view thereof. Fig. 3 is a perspective detail of the eye at the rear end of the trace.

In the drawings the letter W designates the whiffletree and T the trace, both of which are of the ordinary or any preferred construction. Upon the end of the whiffletree is fastened a metal sleeve 5, the fastening means being preferably a cotter pin 6 passed through upright holes 7 in the sleeve and through a similar hole 8 in the whiffletree, although any other form of fastener might be substituted. The outer end of the sleeve is enlarged into a flange 9 whose inner face is flat but whose outer face and the outer end of the sleeve itself and the outer extremity of the whiffletree may have any desired configuration. Slidably mounted upon the exterior of the sleeve, inside its flange, is a washer 10 having a flat outer face and a rounded inner face 11, and by preference the latter is formed with notches 12 through it at proper points to admit of the passage of the fastening device 6 as best seen in Fig. 2.

Loosely mounted around the sleeve 5 and disposed between the flat faces of the flange 9 and the washer 10 is an eye 13, and formed integral with and projecting from diametrically opposite sides of this eye are arms 14 and 15 made respectively short and long as shown in Fig. 1. Formed integral with the outer end of the arm 15 is an enlarged head or disk 16, from whose center a pin 17 projects inward for some little distance and is provided at its extremity with a forwardly projecting lug 18. The outer end of the rearmost arm 14 is similarly constructed, and when thrown over to the front as shown in Fig. 1 its pin and lug will stand relatively in the same position as do those now there, but on account of the reduced length of the arm 14 they will stand nearer to the whiffletree as will be clear.

At the rear end of the trace T is the eye-member thereof which of necessity must be made in such shape as to coöperate with the device as above described. It may well comprise a bolt 20 engaged with the trace, and with the extremities of a frame 21 which latter carries an upright disk 22, and through said disk is formed a hole 23 with an offset 24 at its top. This offset is made in the shape of a notch radial to the hole and of a size to pass over the lug 18 on either pin 17, provided only that at the time of such passage the disk be rotated on its own axis so that said offset or notch shall project forward the same as does the lug 18 at that time. Or, if the trace be too stiff or the horse is too fractious to permit of this bending movement, it is quite possible that the metal member which is rotatably mounted upon the whiffletree may be turned to an upright position (at right angles to that illustrated in Fig. 1), and then if the trace be drawn back a little farther than usual the hole and offset in its disk can be passed over the pin and lug on that head of the whiffletree hook which stands uppermost, after which by releasing the hold the parts assume the proper position for use.

All parts of this device are preferably of metal. Those parts connected with the whiffletree can well be sold separate from the whiffletree itself and attached thereto by any one who is skilled in mechanics to a sufficient extent, as also can the metal portions which are to be attached to the trace. Hence my device becomes an attachment which can be applied to whiffletrees and harnesses already in use, without the exercise of much ingenuity and at the expense of but little time and labor.

When it is desired to hitch the horse farther back than would be the case if the parts stood as shown in Fig. 1, the trace is disconnected, the entire swinging portion of the whiffletree hook turned over half a revolution around the whiffletree, and the trace reattached. On the other hand, if the horse is a larger one or it is desired to attach him with the parts standing as relatively shown in Figs. 1 and 2, connection or disconnection can quickly be made in the manner above described.

A striking feature of my invention is the adaptability of the whiffletree hook to be moved so as to connect it with the eye end of the trace without necessarily bending a trace which is sometimes very stiff and therefore when bent repeatedly will soon become broken or injured.

What is claimed is:

1. The herein described whiffletree hook comprising an eye, means for mounting it rotatably on the extremity of a whiffletree, and a plurality of trace-engaging arms of different lengths projecting from different sides of said eye.

2. The herein described whiffletree hook comprising an eye having arms of different lengths projecting from its different sides, trace-engaging devices at the outer ends of said arms, and means for connecting said eye with a whiffletree so as to permit the rotation of one with respect to the other.

In testimony that I claim the foregoing as my own, I have hereto affixed my signature in the presence of two witnesses.

GUY Z. CLARK.

Witnesses:
RONALD HIGGINS,
V. S. KUTCHIN.

Copies of this patent may be obtained for five cents each, by addressing the "Commissioner of Patents, Washington, D. C."